United States Patent [19]

Kuwae et al.

[11] Patent Number: 4,821,153
[45] Date of Patent: Apr. 11, 1989

[54] ELECTROLYTE FOR ELECTROLYTIC CAPACITORS AND ELECTROLYTIC CAPACITOR USING THE ELECTROLYTE

[75] Inventors: Yoshiteru Kuwae; Katsuji Shiono; Takaaki Kishi, all of Kyoto; Hideki Shimamoto, Osaka; Hisao Nagara, Kyoto; Keiji Mori, Kyoto; Shingo Yoshida, Kyoto, all of Japan

[73] Assignees: Matsushita Electric Industrial Co., Ltd; Sanyo Chemical Industries, Ltd., both of Japan

[21] Appl. No.: 127,298

[22] PCT Filed: Feb. 20, 1987

[86] PCT No.: PCT/JP87/00107
§ 371 Date: Oct. 21, 1987
§ 102(e) Date: Oct. 21, 1987

[87] PCT Pub. No.: WO87/05149
PCT Pub. Date: Aug. 27, 1987

[30] Foreign Application Priority Data

Feb. 21, 1986 [JP] Japan .................. 61-38029

[51] Int. Cl.$^4$ ............................... H01G 9/02
[52] U.S. Cl. ..................... 361/505; 252/62.2
[58] Field of Search .............. 361/433 E; 252/62.2, 252/567

[56] References Cited

U.S. PATENT DOCUMENTS

| | | | |
|---|---|---|---|
| 3,539,881 | 11/1970 | Anderson | 361/433 E |
| 3,812,039 | 5/1974 | Niwa | 361/433 |
| 3,872,358 | 3/1975 | Murakami et al. | 361/433 E |
| 4,117,531 | 9/1978 | Ross et al. | 361/433 E |
| 4,377,692 | 3/1983 | Barry et al. | 252/62.2 X |
| 4,715,976 | 12/1987 | Mori et al. | 252/62.2 |
| 4,734,821 | 3/1988 | Morimoto et al. | 361/433 |

FOREIGN PATENT DOCUMENTS

| | | |
|---|---|---|
| 33345 | 5/1973 | Japan . |
| 7564 | 1/1979 | Japan . |
| 125610 | 7/1984 | Japan . |
| 232410 | 12/1984 | Japan . |
| 7617 | 1/1986 | Japan . |
| 32509 | 2/1986 | Japan . |
| 93610 | 5/1986 | Japan . |

Primary Examiner—Donald A. Griffin
Attorney, Agent, or Firm—Lowe, Price, LeBlanc, Becker & Shur

[57] ABSTRACT

This invention relates to an electrolyte for use in electrolytic capacitors and also to an electrolytic capacitor using the electrolyte. The solute for the electrolyte is a quaternary ammonium salt of either a carboxylic acid selected from the group consisting of phthalic acid, tetrahydrophthalic acid, hexahydrophthalic acid and maleic acid, or an alkyl or nitro-substituted compound of the acid. The electrolytic capacitor has improved low temperature characteristics and an improved variation in characteristics at high temperatures in relation to time with a prolonged life.

33 Claims, 2 Drawing Sheets

ELECTROLYTE FOR ELECTROLYTIC CAPACITORS AND ELECTROLYTIC CAPACITOR USING THE ELECTROLYTE

TECHNICAL FIELD

This invention relates to an electrolyte for use in electrolytic capacitors and also to an electrolytic capacitor using the electrolyte.

TECHNICAL BACKGROUND

A typical electrolyte for electrolytic capacitors which has been hitherto used is an electrolyte of an ionogen dissolved in ethylene glycol. However, this type of electrolyte has a low specific conductance and tends to cause an impedance characteristic to deteriorate. To avoid this, usual practice is to add water to the electrolyte, but such an electrolyte is elevated in vapor pressure at high temperatures and is apt to react with an aluminum electrode, thus being unsuitable for use in a high temperature range.

In order to improve the above drawbacks, there have been proposed an electrolyte using $\gamma$-butyrolactone as a solvent and a triethylamine salt of phthalic acid as described in Japanese Laid-open patent application No. 61-70711 and an electrolyte an amine salt of maleic acid dissolved in a mixed solvent of $\gamma$-butyrolactone and ethylene glycol as described in Japanese Laid-open patent application No. 54-7564.

Moreover, Japanese Laid-open patent application No. 59-78522 describes electrolytes using quaternary ammonium salts of linear dicarboxylic acids, and Japanese Laid-open patent application No. 61-93610 teaches electrolytes using tetralkylammonium salts of 1,10-decanedicarboxylic acid or 1,6-decanedicarboxylic acid.

However, the known electrolytes comprising triethylamine salts of phthalic acid or maleic acid dissolved in a $\gamma$-butyrolactone solvent are disadvantageous in that the acid dissociation is caused by the proton equilibrium of the triethylamine, so that ions are produced only in small amounts. Thus, a sufficiently high specific conductance cannot be obtained. On the other hand, with electrolytes using the quaternary ammonium salts of linear dicarboxylic acids or the tetraalkylammonium salts of 1,10-decanedicarboxylic acid or 1,6-decanedicarboxylic acid, the specific conductance becomes low because of the rather inappropriate combination with the acid. Accordingly, electrolytic capacitors using these electrolytes cannot disadvantageously lower the impedance characteristic.

DISCLOSURE OF THE INVENTION

The present invention contemplates to provide an electrolyte for electrolytic capacitors and an electrolytic capacitor using the electrolyte in which a solute of the electrolyte used is a quaternary ammonium salt of either a carboxylic acid selected from the group consisting of phthalic acid, tetrahydrophthalic acid, hexahydrophthalic acid and maleic acid, or an alkyl or nitro-substituted compound of the acid, whereby the resultant electrolytic capacitor has improved low temperature characteristics and improved characteristics with time at high temperatures, thus ensuring a prolonged life.

BRIEF DESCRIPTION OF THE DRAWINGS

FIGS. 2-4 are, respectively, graphs of characteristics, in relation to time, of aluminum electrolytic capacitors having ratings 10 V and 2200 $\mu$F ($\phi 16 \times 32$) and using known electrolytes and electrolytes of the invention, in which FIG. 2 is a characteristic graph showing a variation in electrostatic capacity by application of a rated voltage, FIG. 3 is a characteristic graph showing a variation in tangent of the loss angle by application of a rated voltage, and FIG. 4 is a characteristic graph of a variation in leakage current in the absence of an applied voltage.

Figure 1:
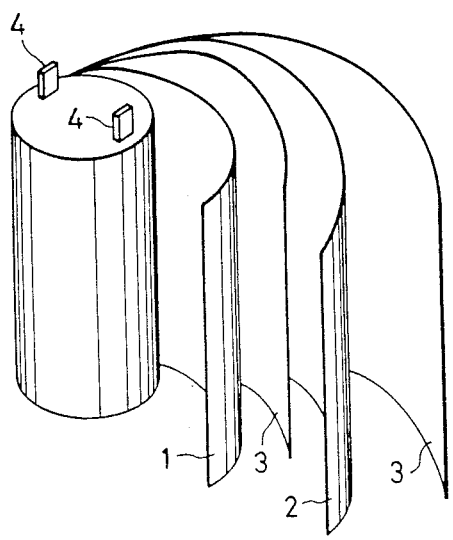
FIG. 1 is a schematic perspective view illustrating the respective members of an electrolytic capacitor.

The following reference numerals are used in the drawings

1 ... ANODE FOIL
2 CATHODE FOIL
3 ... SEPARATOR
4 ... LEADING TAB.

BEST MODE FOR CARRYING OUT THE INVENTION

The present invention provides an electrolyte for use in an electrolytic capacitor which comprises a solution, in an organic solvent, of a quaternary ammonium salt of a carboxylic acid selected from the group consisting of phthalic acid, a tetrahydrophthalic acid, hexahydrophthalic acid and maleic acid, or of an alkyl or nitro-substituted compound of the carboxylic acid, and also provides an electrolytic capacitor using the electrolyte.

The quaternary ammonium salts are those compounds of the following general formula

in which $X_1$ represents

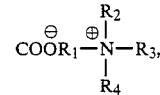

$X_2$ represents

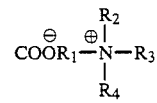

or COOH in which each $R_1$, each $R_2$, each $R_3$ and each $R_4$ independently represent an alkyl group, an aryl group, a cycloalkyl group, an aralkyl group and/or a hydroxyalkyl group, or the two of these substituents may combine to form a divalent group which forms a ring along with the nitrogen atom, and A represents a carboxylic acid residue.

In the above general formula, $R_1$, $R_2$, $R_3$ and $R_4$ are, respectively, a $C_{1-12}$ alkyl group (such as methyl, ethyl, propyl, butyl, octyl, dodecyl and the like), an aryl group (such as phenyl and the like), a cycloalkyl group (such as cyclohexyl and the like), an aralkyl group (such as benzyl and the like), and a C$_{2-4}$ hydroxyalkyl group (such as hydroxyethyl and the like). Alternatively, these two substituents may combine to give a divalent group such as, for example, —(CH$_2$)n— wherein n is 5 or 6, or —CH$_2$CH$_2$OCH$_2$CH$_2$—, and form a ring along with the nitrogen atom.

In the practice of the invention, the tetrahydrophthalic acid includes cyclohexene-1,2-dicarboxylic acid and cyclohexene-4,5-dicarboxylic acid.

The alkyl-substituted compound of the carboxylic acid is one whose alkyl moiety has 1-3 carbon atoms, e.g. a methyl-substituted compound. Examples of the alkyl-substituted compound include methylmaleic acid (citraconic acid) and dimethylmaleic acid. Examples of the nitro-substituted compounds include 3- or 4-nitrophthalic acid. These carboxylic acids and their alkyl or nitro-substituted compounds may be used in combination.

Examples of the quaternary ammonium salts include tetraalkylammonium salts (whose alkyl moiety has generally 1-12 carbon atoms, e.g. a tetramethylammonium salt, a tetraethylammonium salt, a tetrapropylammonium salt, a tetrabutylammonium salt, a methyltriethylammonium salt, an ethyltrimethylammonium salt and the like), aryltrialkylammonium salts (such as a phenyltrimethylammonium salt and the like), cyclohexyltrialkylammonium salts (such as a cyclohexyltrimethylammonium salt and the like), arylalkyltrialkylammonium salts (such as a benzyltrimethylammonium salt and the like), trialkylhydroxyalkylammonium salts (such as a trimethylhydroxyethylammonium salt and the like), N,N-dialkylpiperidinium salts (such as an N,N-dimethylpiperidinium salt and the like), and mixtures thereof.

Of these quaternary ammonium salts, the tetraalkylammonium salts and the trialkylhydroxyalkylammonium salts are preferred. Most preferably, a tetraethylammonium salt is used.

The equivalent ratio between the carboxyl groups of a carboxylic acid and the quaternary ammonium base is generally in the range of 1.2:1.0–2.8:1.0, preferably 1.5:1.0–2.5:1.0, and most preferably 2.0:1.0. In other words, a mono-salt having a molar ratio between the acid and the base of 1:1 is most preferably used.

The electrolyte for an electrolytic capacitor according to the invention comprises the above-defined salt and an organic solvent. Examples of the organic solvent include alcohols, e.g. monohydric alcohols such as butyl alcohol, diacetone alcohol, benzyl alcohol, amino alcohols and the like, dihydric alcohols such as ethylene glycol, propylene glycol, dithylene glycol, hexylene glycol, phenyl glycol and the like, trihydric alcohols such as glycerine, 3-methylpentane-1,3,5-triol and the like, and hexitol; ethers, e.g. monoethers such as ethylene glycol monomethyl ether, ethylene glycol monoethyl ether, diethylene glycol monomethyl ether, diethylene glycol monoethyl ether, ethylene glycol phenyl ether and the like, diethers such as ethylene glycol dimethyl ether, ethylene glycol diethyl ether, diethylene glycol dimethyl ether, diethylene glycol diethyl ether and the like; amides, e.g. formamides such as N-methylformamide, N,N-dimethylformamide, N-ethylformamide, N,N-diethylformamide and the like, acetamides such as N-methylacetamide, N,N-dimethylacetamide, N-ethylacetamide, N,N-diethylacetamide and the like, propionamides such as N,N-dimethylpropionamide and the like, and hexamethylphosphoryl amide; oxazolidinones such as N-methyl-2-oxazolidinone, N-ethyl-2-oxazolidinone, 3,5-dimethyl-2-oxazolidinone and the like; dimethylsulfoxide, γ-butyrolactone and the like; and mixtures thereof.

Of these, amides, oxazlidinones and γ-butyrolactone are preferred. More preferably, γ-butyrolactone alone or a mixed solvent comprising a major proportion of γ-butyrolactone is used. In the latter case, the content of the γ-butyrolactone is preferably in the range of 50-100% based on the total weight of the solvent.

The electrolyte of the invention may further comprise water, if necessary. The content of water is generally not larger than 10% based on the weight of the electrolyte.

In an electrolyte using γ-butyrolactone alone or a mixed solvent comprised mainly of γ-butyrolactone as a solvent and a tetraethylammonium salt of phthalic acid or maleic acid as a solute, when a mono salt having a molar ratio of the acid and the base of 1:1 is used, a maximum specific conductance is shown. Accordingly, monotetraethylammonium phthalate or monotetraethylammonium maleate is preferred.

The amount of the quaternary ammonium salt in the electrolyte is generally in the range of 1 wt%–40 wt%, preferably 5 wt%–30 wt%. The amount of the organic solvent is in the range of 60 wt%–99 wt%, preferably 70 wt%–95 wt%.

The electrolyte of the invention obtained as described above has a high specific conductance and good stability at high temperatures. The use of the electrolytes results in an electrolytic capacitor which has a low impedance and is stable at high temperatures. More particularly, when a solute which is used in combination with a solvent comprised mainly of γ-butyrolactone is phthalic acid, maleic acid, nitrophthalic acid, hexahydrophthalic acid or citraconic acid, very high conductance is obtained. In γ-butyrolactone, phthalic acid, maleic acid, nitrophthalic acid, tetrahydrophthalic acid, hexahydrophthalic acid, citraconic acid, and tetraethylammonium are very stable at high temperatures. In addition, the reaction between the solute and the solvent and the reaction between phthalic acid, maleic acid, nitrophthalic acid, tetrahydrophthalic acid, hexahydrophthalic acid or citraconic acid and tetraethylammonium do rarely take place. Presumably, this is why the stability at high temperatures is excellent.

In the practice of the invention, the concentration of the quaternary ammonium salt is in the range of 1 wt%–40 wt%. If the amount is less than 1 wt%, the specific conductance does not become satisfactorily high. Over 40 wt%, precipitation will take place.

(EXAMPLES)

The present invention is illustrated by way of examples.

In Table 1, there are shown electrolytic compositions according to the invention and for comparison along with their specific conductance at normal temperatures.

As will be clear from Table 1, higher specific conductances can be obtained than the conductances of the known electrolytes.

TABLE 1

| Electrolytic Compositions of Invention and for Comparison and Specific Conductances | | |
|---|---|---|
| | Electrolytic Composition (parts by weight) | Specific Conductance 30° C., (ms/cm) |
| Reference 1 | γ-butyrolactone 75 | 3.7 |

TABLE 1-continued

Electrolytic Compositions of Invention and for Comparison and Specific Conductances

| | Electrolytic Composition (parts by weight) | | Specific Conductance 30° C., (ms/cm) |
|---|---|---|---|
| Reference 2 | monotriethylammonium phthalate | 25 | |
| | γ-butyrolactone | 75 | 6.1 |
| | ethylene glycol | 8 | |
| | monotriethylammonium maleate | 17 | |
| Reference 3 | γ-butyrolactone | 85 | 3.5 |
| | tetraethylammonium adipate | 15 | |
| Reference 4 | ethylene glycol | 75 | 2.2 |
| | water | 5 | |
| | tetraethylammonium 1,6-decanedicarboxylate | 20 | |
| Example 1 | γ-butyrolactone | 75 | 10.9 |
| | monotetraethylammonium phthalate | 25 | |
| Example 2 | γ-butyrolactone | 68 | 9.3 |
| | ethylene glycol | 7 | |
| | monotetraethylammonium phthalate | 25 | |
| Example 3 | γ-butyrolactone | 60 | 9.4 |
| | 3-methyloxazolidine-2-one | 15 | |
| | monotetraethylammonium phthalate | 25 | |
| Example 4 | γ-butyrolactone | 75 | 16.4 |
| | monotetraethylammonium maleate | 25 | |
| Example 5 | γ-butyrolactone | 68 | 14.9 |
| | ethylene glycol | 7 | |
| | monotetraethylammonium maleate | 25 | |
| Example 6 | γ-butyrolactone | 60 | 15.0 |
| | 3-methyloxazolidine-2-one | 15 | |
| | monotetraethylammonium maleate | 25 | |
| Example 7 | γ-butyrolactone | 75 | 11.5 |
| | monotetraethylammonium 4-nitrophthalate | 25 | |
| Example 8 | γ-butyrolactone | 68 | 10.4 |
| | ethylene glycol | 7 | |
| | monotetraethylammonium 4-nitrophthalate | 25 | |
| Example 9 | γ-butyrolactone | 60 | 10.8 |
| | 3-methyloxazolidine-2-one | 15 | |
| | monotetraethylammonium 4-nitrophthalate | 25 | |
| Example 10 | γ-butyrolactone | 75 | 9.9 |
| | monotetraethylammonium 3-nitrophthalate | 25 | |
| Example 11 | γ-butyrolactone | 75 | 7.0 |
| | monotetraethylammonium cyclohexane-1,2-dicarboxylate | 25 | |
| Example 12 | γ-butyrolactone | 68 | 6.2 |
| | ethylene glycol | 7 | |
| | monotetraethylammonium cyclohexene-1,2-dicarboxylate | 25 | |
| Example 13 | γ-butyrolactone | 60 | 6.6 |
| | 3-methyloxazolidine-2-one | 15 | |
| | monotetraethylammonium cyclohexene-1,2-dicarboxylate | 25 | |
| Example 14 | γ-butyrolactone | 75 | 8.0 |
| | monotetraethylammonium cyclohexene-4,5-dicarboxylate | 25 | |
| Example 15 | γ-butyrolactone | 75 | 13.8 |
| | monotetraethylammonium citraconate | 25 | |
| Example 16 | γ-butyrolactone | 68 | 13.2 |
| | ethylene glycol | 7 | |
| | monotetraethylammonium citraconate | 25 | |
| Example 17 | γ-butyrolactone | 60 | 13.5 |
| | 3-methyloxazolidine-2-one | 15 | |
| | monotetraethylammonium citraconate | 25 | |

In Table 2, there are shown initial characteristics of capacitors using the electrolytes of References 1, 2 and 3 and Examples, 1, 2, 3, 4, 5, 6, 7, 8, 9, 11, 12, 13, 15, 16 and 17 indicated in Table 1. The capacitor used was an aluminum electrolytic capacitor having ratings of 10 V and 220 μF (φ16×32). FIG. 1 schematically shows an arrangement of the respective parts or members of this type of aluminum electrolytic capacitor. In FIG. 1, an anode foil 1 used as an anode of aluminum and a cathode foil 1 used as a cathode of aluminum are convolutely wound so that they are in face-to-face relation through a separator 3, thereby providing a capacitor element. The anode foil 1 and the cathode foil 2 of the element have leading tabs 4, respectively.

The thus arranged element is impregnated with each electrolyte and is sealingly encased in a case to obtain an electrolytic capacitor.

TABLE 2

Comparison of Initial Characteristics Average Value of n = 10 Capacitors

| | Electrostatic Capacity (120 Hz) (μF) | tan d (120 Hz, 20° C.) (%) | Leakage Current (μA) | Impedance (100 KHz, 20° C.) (mΩ) |
|---|---|---|---|---|
| Reference 1 | 2160 | 12.3 | 8.0 | 86 |
| Reference 2 | 2170 | 7.4 | 6.9 | 51 |
| Reference 3 | 2170 | 12.8 | 8.5 | 90 |
| Example 1 | 2190 | 5.6 | 5.5 | 29 |
| Example 2 | 2190 | 6.2 | 5.3 | 33 |
| Example 3 | 2190 | 5.9 | 5.9 | 33 |
| Example 4 | 2180 | 4.1 | 6.1 | 17 |
| Example 5 | 2190 | 4.6 | 5.7 | 23 |
| Example 6 | 2180 | 4.4 | 5.8 | 22 |
| Example 7 | 2190 | 5.2 | 6.0 | 24 |
| Example 8 | 2210 | 5.5 | 5.8 | 26 |
| Example 9 | 2200 | 6.0 | 6.1 | 25 |
| Example 11 | 2180 | 7.1 | 5.9 | 45 |
| Example 12 | 2190 | 7.3 | 5.8 | 49 |
| Example 13 | 2170 | 7.1 | 6.2 | 48 |
| Example 15 | 2180 | 4.6 | 6.1 | 24 |
| Example 16 | 2200 | 4.9 | 5.9 | 25 |
| Example 17 | 2190 | 4.4 | 6.3 | 22 | tan δ: tangent of the loss angle

As will be apparent from Table 2, the electrolytes of Examples of the invention have significantly lower tan δ (120 Hz) and impedance (100 KHz) characteristics than the known electrolytes.

Figure 2:
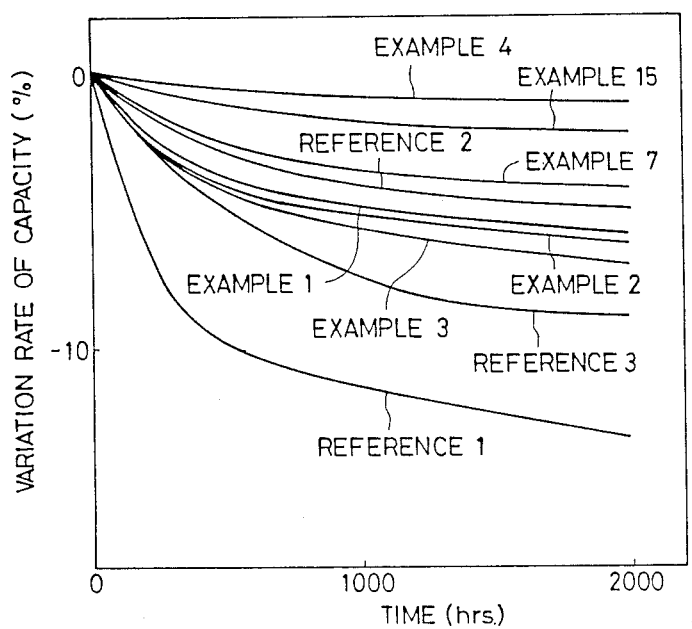
Figure 3:
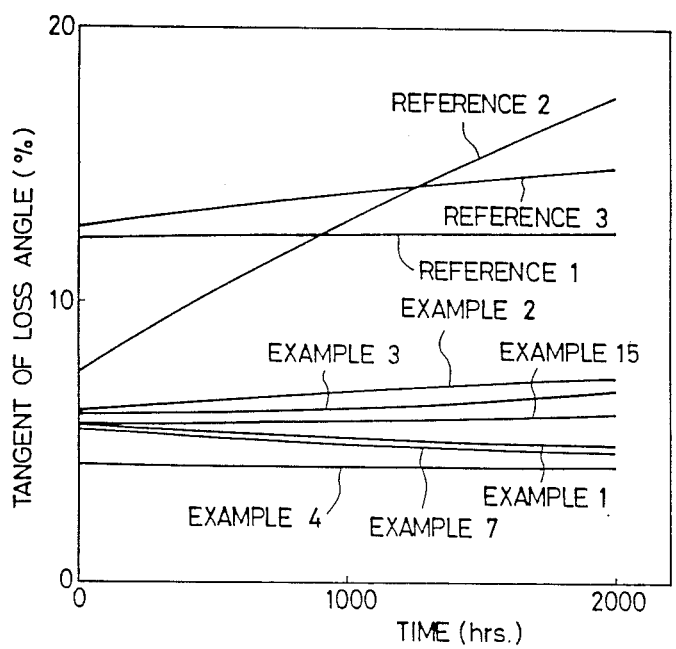
Figure 4:
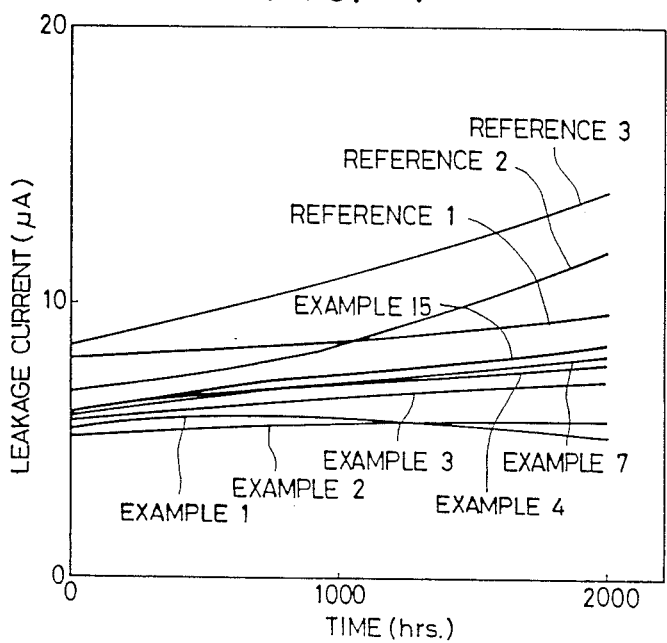

FIGS. 2 to 4 show variations in the respective characteristics at 105° C. of the aluminum electrolytic capacitors using the electrolytes of References 1, 2 and 3 and Examples 1, 2, 3, 4, 7 and 15 in relation to time. More particularly, FIG. 2 shows a variation in electrostatic capacity obtained by application of a rated voltage, FIG. 3 shows a variation in tangent of the loss angle obtained by application of a rated voltage, and FIG. 4 shows a variation in leakage current without application of any voltage.

As will be clear from FIGS. 2-4, the characteristic variations under high temperature conditions are very small and thus, highly reliable capacitors can be obtained.

INDUSTRIAL UTILITY

As described hereinbefore, the electrolytes for electrolytic capacitors and capacitors using such electrolytes according to the invention have high specific conductance, and the loss of the capacitor can be improved over a wide range of normal to low temperatures. Because the electrolytes do rarely deteriorate at high temperatures, electrolytic capacitors whose characteristics do not vary over a long term can be obtained.

Thus, the present invention provides an electrolytic capacitor which exhibits stable characteristics over a wide temperature range of from low to high temperatures.

What is claimed is:

1. An electrolyte for an electrolytic capacitor comprising an organic solvent solution of a tetraalkylammonium salt of
    a carboxylic acid selected from the group consisting of phthalic acid, tetrahydrophthalic acid, hexahydrophthalic acid and maleic acid, or
    an alkyl or nitro-substituted compound of said carboxylic acid.

2. The electrolyte of claim 1, wherein said tetraalkylammonium salt is a tetramethylammonium salt.

3. The electrolyte of claim 1, wherein said tetraalkylammonium salt is an ethyltrimethylammonium salt.

4. The electrolyte of claim 1, wherein the alkyl or nitro-substituted compound of the carboxylic acid is citraconic acid or nitrophthalic acid.

5. The electrolyte of claim 1, wherein said tetraalkylammonium salt is monotetraethylammonium phthalate.

6. The electrolyte according to claim 1, wherein said tetraalkylammonium salt is monotetraethylammonium maleate.

7. The electrolyte of claim 1, wherein said solvent comprises gamma-butyrolactone.

8. The electrolyte of claim 7, wherein said solvent consists essentially of gamma-butyrolactone.

9. The electrolyte of claim 1, wherein said tetraalkylammonium salt is present in an amount of about 1 to 40 st% based on the weight of the electrolyte.

10. The electrolyte of claim 1, wherein said tetraalkylammonium salt is the salt of the ($C_1$-$C_3$) alkyl-substituted compound of the carboxylic acid.

11. An electrolyte comprising an organic solvent solution of a
    trialkylhydroxyalkylammonium salt of a carboxylic acid selected from the group consisting of phthalic acid, tetrahydrophthalic acid, hexahydrophthalic acid and maleic acid or
    an alkyl or nitro-substituted compound of said carboxylic acid.

12. The electrolyte of claim 11, wherein said trialkylhydroxyalkylammonium salt is a trimethylhydroxyethylammonium salt.

13. The electrolyte of claim 11, wherein said triallkylhydroxyalkylammonium salt is a triethylhydroxyethylammonium salt.

14. The electrolyte of claim 11, wherein said alkyl or nitro-substituted compound of the carboxylic acid is citraconic acid or nitrophthalic acid.

15. The electrolyte of claim 11, wherein said trialkylhydroxyalkylammonium salt is monotrimethylhydroxyethylammonium phthalate.

16. The electrolyte of claim 11, wherein said trialkylhydroxyalkylammonium salt is monotrimethylhydroxyethylammonium hexahydrophthalate.

17. The electrolyte of claim 11, wherein said trialkylhydroxyalkylammonium salt is monotrimethylhydroxyethylammonium hexahydrophthalate.

18. The electrolyte of claim 11, wherein said solvent is a solvent comprising gamma-butyrolactone.

19. An electrolyte of claim 18, wherein said solvent consists essentially of gamma-butyrolactone.

20. The electrolyte of claim 11, wherein said trialkylhydroxyalkylammonium salt is present in an amount of about 1 to 40 wt% based on the weight of the electrolyte.

21. The electrolyte of claim 11, wherein said trialkylhydroxyalkylammonium salt is a salt of the alkyl-substituted compound of the carboxylic acid in which the alkyl moiety has from 1 to 3 carbon atoms.

22. An electrolytic capacitor, comprising a capacitor element provided with an anode and a cathode facing one another through a separator, said capacitor element being impregnated with an electrolyte which comprises an organic solvent solution of an electrolyte solution selected from the group consisting of a tetraalkylammonium salt and a trialkylhydroxyalkylammonium salt of a carboxylic acid selected from the group consisting of phthalic acid, tetrahydrophthalic acid, hexahydrophthalic acid and maleic acid and an alkyl or nitro-substituted compound of said carboxylic acid.

23. The electrolytic capacitor of claim 22, wherein said electrolyte comprises said tetraalkylammonium salt.

24. The electrolytic capacitor of claim 23, wherein said tetraalkylammonium salt is a tetramethylammonium salt.

25. The electrolytic capacitor of claim 23, wherein said tetraalkylammonium salt is monotetraethylammonium phthalate.

26. The electrolytic capacitor of claim 23, wherein said tetraalkylammonium salt is monotetraethylammonium maleate.

27. The electrolytic capacitor of claim 23, wherein said tetraalkylammonium salt is an ethyltrimethylammonium salt.

28. The electrolytic capacitor of claim 23, wherein said trialkylhydroxyalkylammonium salt is a trimethylhydroxyethylammonium salt.

29. The electrolytic capacitor of claim 22, wherein the alkyl or nitro-substituted compound of the carboxylic acid is selected from the group consisting of citraconic acid and nitrophthalic acid.

30. The electrolytic capacitor of claim 22, wherein said electrolyte comprises said trialkylhydroxyalkylammonium salt.

31. The electrolytic capacitor of claim 22, wherein said organic solvent comprises gamma-butyrolactone.

32. The electrolytic capacitor of claim 22, wherein said organic solvent consists essentially of gamma-butyrolactone.

33. The electrolytic capacitor of claim 22, wherein said tetraalkylammonium salt and said trialkylhydroxyalkyl salt present in amounts of about 1 to 40 wt% of the electrolyte.

* * * * *